N. ZUNINO.
COMBINATION MILK AND MAIL BOX.
APPLICATION FILED NOV. 23, 1910.
988,751.
Patented Apr. 4, 1911.
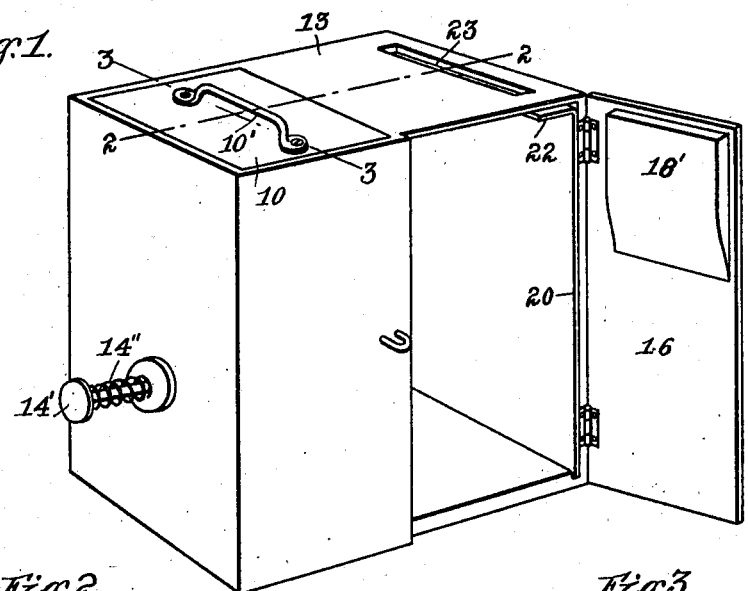
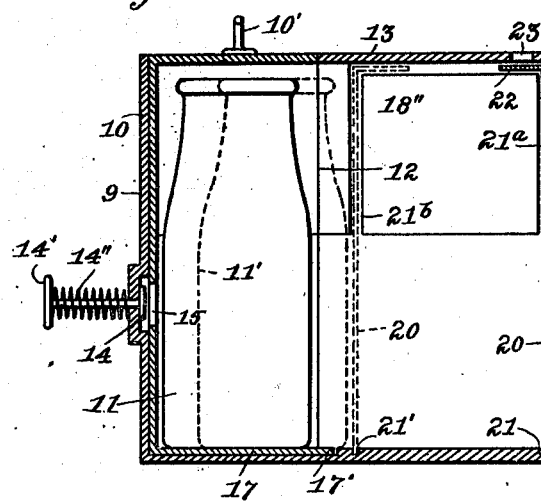
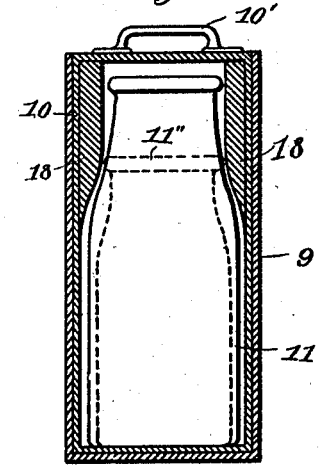
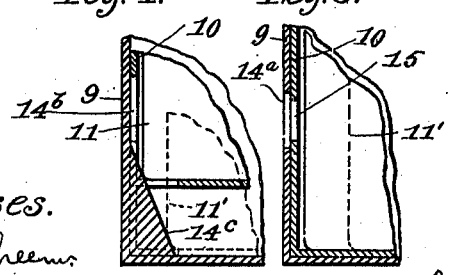
Witnesses.
Wm. N. Rheem.
Anna B. Lindsay.
Inventor
Nicola Zunino
by his attorneys
Mitchell, Chadwick & Kent.
THE NORRIS PETERS CO., WASHINGTON, D. C.

UNITED STATES PATENT OFFICE.

NICOLA ZUNINO, OF BOSTON, MASSACHUSETTS.

COMBINATION MILK AND MAIL BOX.

988,751.  Specification of Letters Patent.  Patented Apr. 4, 1911.

Application filed November 23, 1910. Serial No. 593,827.

*To all whom it may concern:*

Be it known that I, NICOLA ZUNINO, a citizen of the United States, residing at Boston, in the county of Suffolk and State of Massachusetts, have invented new and useful Improvements in Combination Milk and Mail Boxes, of which the following is a specification.

This invention relates to an improved combination milk and mail box.

More particularly it is the object of the invention to provide a box or receptacle which may stand by the side of the street or in any other place accessible to the public wherein a milk contractor without having a key may extract an empty bottle and deposit a customer's daily supply of milk, the receptacle being locked so that an unauthorized person cannot remove the milk; the box being also available for use in receiving delivery of mail from a carrier.

It is one object of the invention to provide means by which these functions may be served in succession, or may be served simultaneously; but the invention is not limited to the combination of these functions but also resides in the provision of them separately, in case, for example, it is not desired to use the receptacle for mail, but only for milk.

It is also the object of the invention to provide apparatus having the other advantages of that hereinafter described.

The objects of the invention are accomplished by an application of the principles of construction and arrangement herein set forth, one embodiment of the invention being illustrated in the accompanying drawings.

In the drawings: Figure 1 is a view in perspective of apparatus embodying the invention; Fig. 2 is a section on the line 2—2 of Fig. 1; Fig. 3 is a section on the line 3—3 of Fig. 1, with the addition of a bottle shown in dotted lines; and Figs. 4 and 5 are fragmentary elevations corresponding to Fig. 2, showing modifications of the invention.

Referring to the drawings, a box or receptacle 9 is seen having a drawer 10 working vertically, there being a handle 10' by which it may be lifted. This drawer is closed on its top, bottom and left-hand side, as seen in the drawings, but is open on the right-hand side where its edge is marked 12. The drawer is capable of receiving a jar 11 which may contain milk or other substance; and the shape and dimensions of the drawer are designed so that a jar of customary size, for example a quart jar, will substantially fill it as shown in the full lines in Figs. 2 and 3. When the drawer 10 is raised above the level of the top 13 of the receptacle, a jar 11 may be inserted from the right and placed in the position in the drawer shown in full lines in Fig. 2, after which the drawer may be returned to its position shown in Fig. 2. In the left wall of the drawer is an opening 15 through which plays a plunger 14 having a knob 14' and a spring 14" by which the plunger is normally held retracted in the position shown in Fig. 2. Having placed the jar in the drawer and returned the drawer to the receptacle the milk-man pushes the knob 14', thereby causing plunger 14 to push the bottle 11 to the dotted line position marked 11'. The drawer is thus locked, because the top of the jar engages the underside of the top 13 of the receptacle. If desired, the plunger 14 may be omitted and a hole 14ª left in its place in the outer wall of the box 9, registering with the hole 15 of the drawer. Through these two holes the milk-man may insert his finger or a stick to push the jar into the described position 11", as represented in Fig. 5. If the jar be pushed by these means, or by any other means, far enough to the right in Fig. 2, it will be out of the drawer 10. The drawer 10 may then be again withdrawn and another jar inserted in like manner, and pushed over by the plunger 14, or by other means, so that both are locked within. As many jars as the dimensions of the receptacle permit may thus be inserted, successively, and the last one of them locks the receptacle as before described. Upon opening the door 16 these jars may be removed from the receptacle. Their unauthorized removal is prevented by the door 16 being locked under normal conditions.

As above described, the jar itself serves as a bolt to prevent the opening of the drawer. The insertion of any implement through the hole 15 to pull the jar back into the drawer to unlock it is prevented by the fact that the stem of the plunger (Figs. 1 and 2) fills the hole through the box. If a smaller jar, for example, a pint jar as represented in the dotted line 11" of Fig. 3, be employed, such as is used for cream, the abstraction of this small jar is prevented in the same way, although the shortness of the jar makes it possible in this case for the drawer 10 to be withdrawn a short distance before it is locked by the top of the jar engaging the top of the box, the filling pieces 18 on each side of the upper part of the drawer 10 prevent the insertion of a person's hand far enough to get at such a jar and move it back into the drawer. So also these filling pieces prevent the hand and wrist from being inserted far enough to reach a jar which has been pushed very far to the right, far enough to clear the bottom 17; and it will also be obvious that in any such case an attempt to insert the hand can only be made when the drawer 10 is partly raised, and that under such circumstances the bottom 17 constitutes a barrier which prevents a jar from being extracted through the opening constituted when the drawer is opened. The projection 17' of the bottom to the right makes this bottom more effective as a barrier in case of such an attempt; and it also, by engaging the underside of top 13 prevents the complete withdrawal of the drawer.

A modification of the invention is illustrated in Fig. 4 in which the lateral movement of the jar is effected automatically. In that case a vertical slot 14$^b$ is formed in the lower part of the left side of the drawer, approximately under where the hole 15 is in Fig. 2, this slot being cut a little into the bottom of the drawer and being adapted to register with an incline or fin 14$^c$ projecting from the interior of box 9 and constituting what may be called a cam. The jar 11 having been placed in the drawer 10, as before described, encounters this cam at the position shown in full lines in Fig. 4, when the drawer is being returned to its normal position. As the drawer continues to descend, the cam pushes the jar laterally from that position to the position 11' shown in dotted lines in Fig. 4, as the jar slides down the face of the cam.

For using the receptacle as a mail box a slot 23 is provided in the top 13. A removable plate of sheet metal 20 is provided which may occupy the position shown in full lines in Fig. 2, where it rests in groove 21 on the bottom of the interior of the box, it being held upright by entering a vertical groove 21$^a$ in the rear of the box. When the door 16 is open this partition may be pulled out and shifted to corresponding grooves 21', 21$^b$, at the left of the door. The width of the partition is such that the door when closed holds it in these grooves. A block 18' on the door and a corresponding block 18'' on the rear wall may project far enough so that they hold in a central position any jar that may occupy that part of the receptacle, as the filling pieces 18 do in Fig. 3; so that by means of these blocks the tipping of a jar sideways is prevented. It will be observed that these blocks help constitute the above described vertical grooves 21$^a$, 21$^b$. The movable partition 20 has a flange 22 at the top adapted to stand under and thus to close the slot 23 when the partition is in the full line position. When the partition is changed to the dotted line position of Fig. 2, the slot 23 is left open and, the door 16 being closed, mail matter may be deposited in the box through the slot 23 without being accessible to any person who may pull out the drawer 10. In the apparatus illustrated, the dimensions are such that when the partition is in the dotted line position, the box being therefore arranged as a mail box, a single jar may be inserted in the drawer 10 and locked in the receptacle. By making adequate space between the position 21$^b$ and the bottom 16 of the drawer, room for another jar may be provided so that a capacity of two jars is provided at the same time the device is available for mail, neither side being accessible from the other. Of course the flange 22 may be omitted, in which case the slot 23 is always open. In such case the entire capacity is available either for jars or for mail when the partition is in position 21$^a$. The purpose of the flange 22, when used, is to prevent any person from pushing a jar back into the drawer by means of an implement inserted through slot 23. The partition itself serves the same purpose when in position 21$^b$.

In ordinary usage it is contemplated that a householder in a rural district or elsewhere, having installed the apparatus in a suitable place, may place an empty jar in the drawer 10, not pushing it over to lock the drawer as above described. The milk dealer may then upon arrival pull out the drawer, take the empty bottle and put in a full one, pushing it into the locked position. The householder then comes at a convenient hour, unlocks the door, removes the jar through the door, and changes the partition 20 from the full line to the dotted line position. This leaves the box in condition to receive mail and to protect it against removal by an unauthorized person. After the post-man has passed, the householder returns, removes the mail, puts the partition back into the full line position, and puts into the drawer an empty jar which the milk-man is to take on his next visit.

It will be observed that variations may be made from the precise arrangements here illustrated, without departing from the principles or scope of the invention, and also that the receptacle may be designed and used as a milk box without using it as a mail box, or that it may be used for both with separate compartments as above described, or may be used with the same compartment serving for both.

If the mail slot 23 be arranged in the adjacent vertical end of the receptacle instead of as shown, it will be closed by the partition 20 when in the position shown in Figs. 1 and 2 and the flange 22 will be unnecessary. The vertical arrangement of the drawer 10 is an advantage because an article, such as a milk jar, when set therein and shifted to locking position, is firmly engaged against a flat or stable base. The fact that it is sitting upright gives a suitable bearing against which the pressure is received when one tries to open the drawer.

I claim as my invention:

1. In apparatus of the class described, the combination of a receptacle having a drawer adapted to admit an article when open, means whereby the article so admitted may be shifted to a position where it engages between the end of the drawer and the wall of the receptacle to lock the drawer; and means for access to the interior of the receptacle while thus locked.

2. In apparatus of the class described, the combination of a receptacle having a drawer adapted to admit an article when open, means whereby the article so admitted may be shifted to a position where it engages between the end of the drawer and the wall of the receptacle to lock the drawer; and means for access to the interior of the receptacle while thus locked; the said drawer moving vertically, whereby it is the top and bottom of the article which are engaged as aforesaid, the said wall of the receptacle being substantially parallel to the said end of the drawer.

3. In apparatus of the class described, the combination of a receptacle having a drawer adapted to admit an article when open; means for access to the article from the exterior to push it, when the drawer is closed, into position where it blocks the opening of the drawer; and means for access to the interior of the receptacle while thus locked.

4. In apparatus of the class described, the combination of a receptacle having a drawer adapted to admit an article when open; a plunger, mounted in the receptacle, adapted to shift the article in the drawer after closing, to lock the receptacle; said plunger having external operating means; and means for access to the interior of the receptacle when thus locked.

5. In apparatus of the class described, the combination of a receptacle having a drawer adapted to admit an article when open, means whereby the article so admitted may be shifted to a position where it engages between the end of the drawer and the wall of the receptacle to lock the drawer; and means for access to the interior of the receptacle while thus locked; there being additional space in the receptacle to which articles may be shifted from the drawer thus permitting the opening of the drawer and insertion of articles successively.

6. In apparatus of the class described, the combination of a receptacle having an opening adapted for admission of articles; and a separate opening adapted for admission of mail, both delivering into common space in the receptacle; the entrance for articles being on one side of the common space and the entrance for mail being in the top of the common space; said partition being movable, and having vertical and horizontal portions, the former closing the entrance for the articles when the partition is in one position and the latter closing the entrance for mail when the partition is in its other posiion; and means for removing the contents.

Signed by me at Boston, Mass., this 16th day of November, 1910.

NICOLA ZUNINO.

Witnesses:
EVERETT E. KENT,
JOSEPH T. BRENNAN.

Copies of this patent may be obtained for five cents each, by addressing the "Commissioner of Patents, Washington, D. C."